US007516172B1

United States Patent
Chen et al.

(10) Patent No.: US 7,516,172 B1
(45) Date of Patent: Apr. 7, 2009

(54) METHOD FOR FINDING QUOTIENT IN A DIGITAL SYSTEM

(75) Inventors: Sau-Gee Chen, Hsinchu (TW); Chieh-Chih Li, Chia-I (TW)

(73) Assignee: United Microelectronics Corp., Hsinchu (TW)

(*) Notice: Subject to any disclaimer, the term of this patent is extended or adjusted under 35 U.S.C. 154(b) by 1663 days.

(21) Appl. No.: 08/510,740

(22) Filed: Aug. 2, 1995

Related U.S. Application Data

(63) Continuation of application No. 08/188,068, filed on Jan. 26, 1994, now abandoned.

(51) Int. Cl.
*G06F 7/52* (2006.01)
(52) U.S. Cl. .............................. 708/653; 708/650
(58) Field of Classification Search ......... 364/764–767; 708/650–656
See application file for complete search history.

(56) References Cited

U.S. PATENT DOCUMENTS

| 4,891,780 | A | * | 1/1990 | Miyoshi | ..................... 364/766 |
|---|---|---|---|---|---|
| 5,012,439 | A | * | 4/1991 | Nash et al. | ................... 364/766 |
| 5,097,435 | A | * | 3/1992 | Takahashi | ................... 364/766 |
| 5,297,073 | A | * | 3/1994 | Davidian | ..................... 364/766 |
| 5,341,322 | A | * | 8/1994 | Fettweiss et al. | ............. 464/766 |

\* cited by examiner

*Primary Examiner*—Emmanuel L Moise
(74) *Attorney, Agent, or Firm*—J. C. Patents

(57) ABSTRACT

A fast division method which uses a smaller quotient digit set of $\{-1, 1\}$ than $\{-1, 0, 1\}$ that is used by known algorithms, therefore accelerates the speed of calculation. Partial remainders can be computed with the signals of remainders decided independently and in parallel. By taking the absolute values of the remainders, we can successively subtract the remainders without the need of knowing the signs of remainders, while signs of the remainders can be decided in parallel and independently at the same time. The algorithm adopts non-restoring division operation and CSA type of operation for fast subtraction. The algorithm is also an on-line algorithm that facilitates highly pipelined operation while it is much simpler than the existing on-line algorithms.

4 Claims, 1 Drawing Sheet

METHOD FOR FINDING QUOTIENT IN A DIGITAL SYSTEM

This is a continuation of application Ser. No. 08/188,068 filed Jan. 26, 1994 now abandoned.

BACKGROUND OF THE INVENTION

The present invention relates to a method for finding a quotient, especially to a method for finding a quotient in a digital system by signed-digit operation.

Inherently, division operation is a sequential operation. The quotient digits are produced only after the sign of the remainder have been detected. As a result, division operation is much slower than multiplication operation. Efforts have been put in speeding up the division operation. It is noted that the SRT algorithm (C. V. Freiman, "Statistical Analysis of Certain Binary division algorithms," Proc. IRE, Vol. 49, January 1961, pp. 91-103; K. Hwang, Computer Arithmetic: Principles, Architectures, and Design, 1979, pp. 222-223) eliminates the restoring operations of the partial remainders. Another algorithm disclosed by K. Hwang in the aforementioned article confines the quotient digits either to be 1 or −1, depending on the signs of remainder. However, the bottleneck of those algorithms lies in sign detection of the remainder. Fast addition algorithms such as CLA (carry-lookahead addition) shorten the operation time, but results in complex hardware structures. The aforementioned articles of C. V. Freiman and K. Hwang are hereby incorporated herein by reference.

Recently, division algorithm based on SD (signed-digit) number representation was proposed which is much faster than the previous algorithm (s. Kuninobu et al., "Design of High Speed MOS Multiplier and Divider Using Redundant Binary Representation," IEEE Proceeding of Symposium on Computer Arithmetic, 1987, pp. 80-86). This algorithm considerably shortens the time for remainder subtraction by using carry-propagation-free SD addition. However, it is much more complex because in each iteration the SD algorithm must check three most significant digit (MSD) bits of the remainder to decide the quotient digit in the set of {−1, 0, 1}, and then perform the SD addition. Moreover, the final SD result must be converted to binary representation. Also note that the signed-digit addition is more complicated than the conventional carry-save adder (CSA).

Another type of algorithms entirely avoids the slow subtract-detect-shift type of operation previously mentioned. They transform the division operation to a series of multiplication operations that converge to the original quotient. Among the examples are the constant convergence (S. Waser and M. J. Flynn, Introduction to Arithmetic for Digital Systems Designers, New York: CBS College Publishing, Chap. 5, 1982) and quadratic convergence (P. Markenstein, "Computation of Elementary Functions on the IBM RISC System/6000 Processor," IBM Journal of Research and Development, Vol. 34, 1990, pp. 111-119; D. A. Patterson and J. L. Hennessy, Computer: A Quantitative Approach, San Mateo, Calif., Morgan Kaufman, 1990) division algorithms which are based on Newton-Raphson algorithm. They are often found in multiplier-based processors. They are still sequential type of operation to certain degree, and obviously require much more shift-and-add operations.

There is an on-line division algorithm that facilitates serial/serial division operation (K. S. Trivedi and M. D. Ercegovac, "On-Line Algorithms for Division and Multiplication," IEEE Trans. on Computers, Vol. C-26, No. 7, July 1977). This algorithm has advantages such as that: (a) it is pipelined at digit level; (b) all operands and results are communicated digit serial, and (c) result digits are on-line obtained after a few initial delay. On the other hand, among some of its disadvantages are: (a) it requires more complex three-input signed-digit addition operation; (b) it needs more complicated quotient decision circuit for range detection of the remainder, and (c) output results have to be converted to binary representations.

SUMMARY OF THE INVENTION

In this work, a fast radix-2 division algorithm and its architecture is proposed. The algorithm adheres to the shift/subtract-and-add type of division operation. The key idea behind this algorithm is to separate the sign detection operation of remainder from the remainder subtraction operation. By taking the absolute values of the remainders, we can successively subtract the remainders without the need of knowing the signs of remainders, while signs of the remainders can be decided in parallel and independently at the same time. To enhance the algorithm's performance, several design techniques were incorporated into its architecture realization.

The new algorithm and its architecture retain as many of the advantages of the mentioned algorithms as possible, and simultaneously gets rid of their disadvantages. The algorithm adopts non-restoring division operation and CSA type of operation for fast subtraction. Quotient digit set of $\{1, -1\}$ is assumed for fast quotient conversion to binary representation. The algorithm is also an on-line algorithm that facilitates highly pipelined operation while it is much simpler than the existing on-line algorithms.

This object of the present invention is fulfilled by providing a method for finding a quotient $Q=a_0 a_1 a_2 \ldots a_b$ from a divisor $Y=y_1 y_2 \ldots y_n$ and a dividend $X=x_1 x_2 \ldots x_n$. The method comprises the following steps of: (a) aligning the first non-zero bit of X with the first non-zero digit of Y; (b) defining a signed-digit partial remainder series $R_i$ where $R_0=Y$, a first sign series of the partial remainder $S_i$ where $S_0=0$, a second sign series of the partial remainder $S_n$, and a counter i beginning from zero; (c) subtracting X from $R_i$ which yields next signed-digit partial remainder $R_{i+1}$; (d) setting the sign of $R_{i+1}$ to $S_{n+1}$; (e) setting the result of exclusive-OR of $S_i$ and $S_{n+1}$ to the true sign of the next remainder $S_{i+1}$; (f) setting $a_i$ to 1 if $S_{i+1}=0$ or $R_{i+1}=0$; (g) setting $a_i$ to 0 if $S_{i+1}=1$; (h) inverting the signs of all digits of $R_{i+1}$ if $S_{i+1}=1$; (i) shift $R_{i+1}$ left by one bit; (j) adding 1 to i; and (k) repeating said steps (c) to (j) until it reaches a predetermined value or $R_{i+1}=0$.

Further scope of applicability of the present invention will become apparent from the detailed description given hereinafter. However, it should be understood that the detailed description and specific examples, while indicating preferred embodiments of the invention, are give by way of illustration only, since various changes and modifications within the spirit and scope of the invention will become apparent to those skilled in the art from this detailed description.

DETAILED DESCRIPTION OF THE EMBODIMENTS

Figure 1:
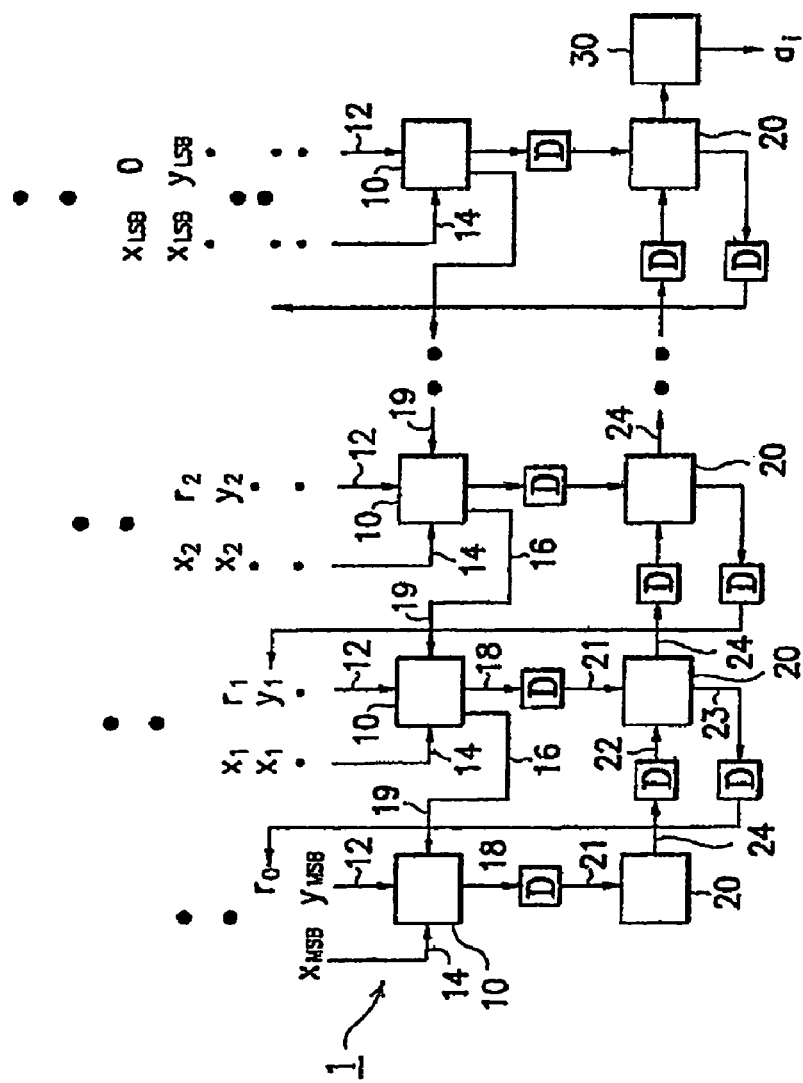
FIG. 1 shows in block diagram form an overview of the digital information processing system implementing the invention.

For achieving fast division, a new division algorithm is proposed and discussed hereinafter.

New Division Algorithm

Given normalized n-bit sign magnitude operands $1/2 \leq |X| < 1$, $1/2 \leq |Y| < 1$ (this limitation is used to automatically align the first non-zero bit of X with the first non-zero digit of Y in the later discussion, which is avoided in circuit realization), quotient $Q_2$ of Y/X can be solved using the following principles, where the quotient digits $Q_2 = a_s a_0 \cdot a_1 a_2 \ldots a_n$ is in sign-magnitude representation and $a_s$ is the sign bit.

Principle 1

$a_s$ equals to the result of exclusive-OR of the sign bits $y_s$ and $x_s$ of Y and X, respectively, i. e., $a_s = y_s \oplus x_s$.

Principle 2

Partial remainder $R_{i+1}$ can be solved by modifying the conventional, nonrestoring algorithm stated by K. Hwang as follows. The signed-binary quotient Q has its quotient digit $q_i \in \{1, -1\}$, and $$R_{i+1} = 2|R_i - q_{i+1}'X| \quad (1)$$

where $R_0 = |y|$, $q_0 = 1$, $q_i'$ is the i-th pseudo quotient digit. Since $R_{i+1}$ is always positive, Eq. (1) can be rewritten as $$R_{i+1} = 2|R_i - X| \quad (2)$$

$$q_{i+1} = \begin{cases} 1, & \text{if } S_{i+1} = 0 \\ 1, & \text{if } Z_{i+1} = 1 \\ -1, & \text{if } S_{i+1} = 0 \end{cases} \quad (3)$$

$$a_i = \begin{cases} 1, & \text{if } q_{i+1} = 1 \\ 0, & \text{if } q_{i+1} = -1 \end{cases} \quad (4)$$

where
$S_n$=The sign of remainder $(R_i - X)$,
$S_i$=True sign of i-th remainder=$S_{i-1} \oplus S_n$,
$Z_i$=Zero Flag, $Z_0 = 0$, and
$S_0 = S_{r0} = \text{Sign}\{R_0\} = 0$.

The algorithm can be performed using the method described below.

New Division Method

Define signed magnitude numbers $Y_s = y_s \cdot y_1 y_2 \ldots y_n$, $X_s = x_s \cdot x_1 x_2 \ldots x_n$, and $Q_s = q_s q_0 \cdot q_1 q_2 \ldots q_b$ in signed-binary representation, $q_s \in \{-1, 1\}$, and converted to sign magnitude representation $Q_2 = a_s a_0 \cdot a_1 a_2 \ldots a_b$, $a_i \in \{0, 1\}$. The quotient $Q_2$ of $X_s/Y_s$ can be solved by the following steps:

Step 1:
$a_s = y_s \oplus x_s$.

Step 2:
Define $Y = y_1 y_2 \ldots y_n$, $X = x_1 x_2 \ldots x_a$, $Q = a_0 a_1 a_2 \ldots a_b$, $R_0 = Y$, $i = 0$, and $S_0 = 0$.

Step 3:
Subtract X from $R_i$ and yield next signed-digit partial remainder $R_{i+1}$. Set the sign of $R_{i+1}$ to $S_{ri+1}$ (note that the sign of $R_{i+1}$ equals the sign of first non-zero digit of $R_{i+1}$). Set the result of $S_i \oplus S_{ri+1}$ to the true sign of the next remainder $S_{i+1}$. Set $a_i$ to 1 if $S_{i+1} = 0$ (means the remainder is positive) or $R_{i+1} = 0$. Set $a_i$ to 0 if $S_{i+1} = 1$ (means the remainder is negative).

Step 4:
If $S_{i+1} = 1$, then take the absolute value of $R_{i+1}$ (by inverting the signs of all digits). Shift $R_{i+1}$ left by one bit. Add 1 to i. Repeat step 3 until i reaches a predetermined value or $R_{i+1} = 0$.

For better comprehension, two examples are used to demonstrate the division method hereinafter:

EXAMPLE 1

$Y = 01010001_2 = 81$
$X = 00001001_2 = 9$ (X will be shifted left 3 places to align its highest non-zero digit with highest non-zero digit of $R_0$)

```
  1010001    R₀ = Y
 -1001000    X
  0001001    R₁ > 0 then S_{r1} = 0,
             S₁ = S_{r1} ⊕ S₀ = 0, a₀ = 1
```

SHIFT LEFT ONE BIT

```
  0010010
 -1001000    X
 -0110110    R₂ < 0 then S_{r2} = 1,
             S₂ = S_{r2} ⊕ S₂ = 1, a₂ = 0
```

TAKE ABSOLUTE VALUE

```
  0110110
```

SHIFT LEFT ONE BIT

```
  1101100
 -1001000    X
  0100100    R₃ > 0 then S_{r3} = 0,
             S₃ = S_{r3} ⊕ S₂ = 1, a₂ = 0
```

SHIFT LEFT ONE BIT

```
  1001000
 -1001000    X
  0000000    R₄ = 0 then a₃ = 1
```

Result:
The quotient $= a_0 a_1 a_2 a_3 = 1001_2 = 9$, and remainder = 0

EXAMPLE 2

In this example, note that a digit with a bar means a digit having negative value, e.g.
$1\bar{1}_2 = 2 + (-1) = 1$.
$Y = 10101110_2 = 174$
$X = 11_2 = 3$

```
  10101110    R₀ = Y
       -11    X
  0\bar{1}101110  R₁ < 0 then S_{r1} = 1,
              S₁ = S_{r1} ⊕ S₀ = 1, a₀ = 0
```

TAKE ABSOLUTE VALUE

```
  0 1̄0 1̄1̄1̄0
```

SHIFT LEFT ONE BIT

```
  1 1̄0 1̄1̄100
       -11    X
  1̄00 1̄1̄100   R₂ < 0 then S_{r2} = 1,
              S₂ = S_{r2} ⊕ S₁ = 0, a₁ = 1
```

-continued

TAKE ABSOLUTE VALUE

1001110

SHIFT LEFT ONE BIT

```
 100111000
    −11     X
 01111000    R_3 > 0 then S_{r3} = 0,
             S_3 = S_{r3} ⊕ S_2 = 0, a_2 = 1
```

SHIFT LEFT ONE BIT

```
  1001000
    −11     X
  00110000   R_4 > 0 then S_{r4} = 0,
             S_4 = S_{r4} ⊕ S_3 = 0, a_3 = 1
```

SHIFT LEFT ONE BIT

```
 01100000
    −11      X
 1̄0100000    R_5 < 0 then S_{r5} = 1,
             S_5 = S_{r5} ⊕ S_4 = 1, a_4 = 0
```

TAKE ABSOLUTE VALUE

10100000

SHIFT LEFT ONE BIT

```
 10100000
    −11     X
 00000000   R_6 = 0 then a_5 = 1, a_6 = 0
```

The quotient=$a_0 a_1 a_2 a_3 a_4 a_5 a_6 = 0111010_2 = 58$, and remainder=0

Since absolute values of the partial remainders are computed instead of their actual values, the algorithm facilities parallel computations of partial remainder and quotient digit. To further speed up the operation of subtraction in the preferred embodiment, we used specified signed-digit operation.

Specific Signed-Digit Subtraction

Since computations of Eq. (2) involves only the subtraction operation of two positive numbers, $R_i$ and X, we can speed up the computation by defining the CSA-like operation as follows.

$$y_j - x_j = 2c_{j+1} + t_j \qquad (5.a)$$

$$t_j + c_j = r_j \qquad (5.b)$$

wherein $y_j, r_j \in \{-1, 0, 1\}$ $x_j, t_j \in \{0, 1\}$ $c_j \in \{-1, 0\}$.

Here, a signed-digit $y_j$ (represents the j-th digit of $R_i$) subtracts a binary digit $x_j$, then generates carry $c_{j+i}$ and intermediate result $t_j$. The final result $r_j$ (represents the j-th digit of $R_{i+1}$) is obtained by adding $t_j$ and the carry-in bit $c_j$. Since $r_j \in \{-1, 0, 1\}$, there will be no carry generated from $t_j + c_j$. As a result, the specified signed-digit subtraction efficiently eliminates carry propagation. In addition, the complexity of this operation is similar to that of conventional CSA. Example 3 depicts the modified subtraction method where $T_i = t_1 t_2 \ldots t_n$ and $C_i = c_1 c_2 \ldots c_n$.

EXAMPLE 3

$Y = 01010001_2 = 81$
$X = 00001001_2 = 9$

```
  1010001     R_0 = Y
 −1001000     X
  0011001     T_1
 −0001000     C_1
  0001001     R_1 > 0 then S_{r1} = 0,
              S_1 = S_{r1} ⊕ S_0 = 0, a_0 = 1
```

SHIFT LEFT ONE BIT

```
  0010010
 −1001000     X
  1011010     T_2
 −1001000     C_2
 1̄001010     R_2 < 0 then S_{r2} = 1,
              S_2 = S_{r2} ⊕ S_1 = 1, a_1 = 0
```

TAKE ABSOLUTE VALUE

1̄001̄01̄0

SHIFT LEFT ONE BIT

```
 1̄001̄01̄00
  −1001000    X
  111011100   T_3
 −011011100   C_3
  001̄00100   R_3 > 0 then S_{r3} = 0,
              S_3 = S_{r3} ⊕ S_2 = 1, a_2 = 0
```

SHIFT LEFT ONE BIT

```
  1̄001000
 −1001000    X
  10000000   T_4
 −01000000   C_4
         0   R_4 = 0 then a_3 = 1
```

Result:

The quotient=$1001_2 = 9$, and remainder=0

As shown in the above example, $T_i$ and $C_i$ are calculated first, then $R_i$ can be easily decided. The truth table of $t_j$ and $c_{j+1}$ value are listed in table 1, where the signed-digit $r_j$ of $R_i$ is represented by two bits, $r_j^1$ and $r_j^2$. $r_j^1 = \text{sign}(r_j)$, $r_j^2 = |r_j|$.

TABLE 1

TRUTH TABLE OF $t_j$ AND $c_{j+1}$

| $x_j$ | $r_j^1$ | $r_j^1$ | $c_{j+1}$ | $t_j$ |
|---|---|---|---|---|
| 0 | 0 | 0 | 0 | 0 |
| 0 | 0 | 1 | 0 | 1 |
| 0 | 1 | 1 | 1 | 1 |
| 1 | 0 | 0 | 1 | 1 |
| 1 | 0 | 1 | 0 | 0 |
| 1 | 1 | 1 | 1 | 0 |

Note that $r_j$ represents j-th digit of $R_i$ here.

The truth table of $r_j$ (represents the j-th digit of $R_{i+1}$) is listed in table 2.

TABLE 2

TRUTH TABLE OF $r_j$ (the j-th digit of $R_{i+1}$)

| $c_j$ | $t_j$ | $r_j^1$ | $r_i^2$ |
|---|---|---|---|
| 0 | 0 | 0 | 0 |
| 0 | 1 | 0 | 1 |
| 1 | 0 | 1 | 1 |
| 1 | 1 | 0 | 0 |

From the above tables we can see that the signed-digit subtraction can be achieved by a simple digital circuit, and can be pipe-lined for better performance.

CONCLUSION

In summary, the division algorithm have the advantages as follows:

a) It uses a smaller quotient digit set of $\{1, -1\}$ than $\{-1, 0, 1\}$, that simplifies that quotient decision circuits like some known algorithms do, but achieves the exact division and trivial conversion of the results from signed-binary representation to binary representation.

b) It needs no quotient estimator.

c) In each iteration, the algorithm computes partial remainders without knowing the signs of previous remainders and decides the signs of remainders independently and in parallel. In addition, these two operations are done in pipelined fashion and in digit level with maximum throughput rate.

d) Its architecture basically consists of the simple CSA type cells.

e) It can handle either positive or negative operands.

From above discussion, the proposed division algorithm and its architecture is very efficient. The new algorithm's realization is composed of highly regular cellular array, which is suitable for VLSI implementation and can be easily extended to bit-parallel implementation. As can be seen in FIG. 1, digital information processing system 10 includes arithmetic unit 12 and memory 14. Arithmetic unit 12 typically contains VLSI binary logic circuit elements (such as adders, shifters, exclusive-or circuits, etc) which, under system control, receives binary divisor and dividend data from memory 14, performs the steps of the invention, and thereupon provides the resulting quotient data back to memory 14. Those skilled in the art of digital information processing systems can readily provide the interconnection of needed logic circuit elements (and their appropriate control) to implement the invention.

The algorithm can be extended to higher radix divisions such as radix-4 division. Since the remainders are taken absolute values, the digit set contains only digits 1 and 2 is sufficient for the entire radix-4 operation. This greatly reduces the number of search regions for the quotient digits, in contrast to the bigger set of $\{0, 1, 2, 3\}$ that existing algorithms allow.

While the invention has been described by way of an example and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. In a system for digital information processing, said system having a memory, a method for generating data representative of a quotient $Q = a_0 a_1 a_2 \ldots a_b$ from data representative of a divisor $Y = y_1 y_2 \ldots y_n$, and data representative of a dividend $X = x_1 x_2 \ldots x_a$, comprising the steps of:

(a) aligning the first non-zero bit of X with the first non-zero digit of Y;

(b) defining a signed-digit partial remainder series $R_i$ where $R_0 = Y$, a first sign series of the partial remainder $S_i$ where $S_0 = 0$, a second sign series of the partial remainder $S_{ri}$, a quotient bit series $a_i$, and a counter i beginning from zero;

(c) subtracting X from $R_i$ which yields next signed-digit partial remainder $R_{i+1}$;

(d) setting the sign of $R_{i+1}$ to $S_{ri+1}$;

(e) setting the result of exclusive-OR of $S_i$ and $S_{ri+1}$ to the true sign of the next remainder $S_{i+1}$;

(f) setting $a_i$ to 1 if $S_{i+1} = 0$ or $R_{i+1} = 0$;

(g) setting $a_i$ to 0 if $S_{i+1} = 1$;

(h) inverting the signs of all digits of $R_{i+1}$ if $S_{i+1} = 1$;

(i) shift $R_{i+1}$ left by one bit;

(j) adding 1 to i;

(k) repeating steps (c) to (j) until i reaches a predetermined value or $R_{i+1} = 0$; and (l) storing in said memory as said data representative of a quotient, a quotient resulting from step (k).

2. In a system for digital information processing, said system having a memory for storing data, a method for generating data representative of a signed magnitude quotient $Q_2 = a_s a_0 a_1 a_2 \ldots a_b$ from data representative of a signed divisor $Y_s = y_s \cdot y_1 y_2 \ldots y_n$, and data representative of a signed dividend $X_s = x_s \cdot x_1 x_2 \ldots x_s$, comprising the steps of:

(a) obtaining $a_s$ from the result of exclusive-OR of $y_s$ and $x_s$;

(b) defining a divisor $Y = y_1 y_2 \ldots y_n$, a dividend $X = x_1 x_2 \ldots x_s$, a signed-digit partial remainder series $R_i$ where $R_0 = Y$, a first sign series of the partial remainder $S_i$ where $S_0 = 0$, a second sign series of the partial remainder $S_{ri}$, a quotient bit series $a_i$, and a counter i beginning from zero;

(c) aligning the first non-zero bit of X with the first non-zero digit of Y;

(d) subtracting X from $R_i$ which yields next signed-digit partial remainder $R_{i+1}$;

(e) setting the sign of $R_{i+1}$ to $S_{ri+1}$;

(f) setting the result of exclusive-OR of $S_i$ and $S_{ri+1}$ to the true sign of the next remainder $S_{i+1}$;

(g) setting $a_i$ to 1 if $S_{i+1} = 0$ or $R_{i+1} = 0$;

(h) setting $a_i$ to 0 if $S_{i+1} = 1$;

(i) inverting the signs of all digits of $R_{i+1}$ if $S_{i+1} = 1$;

(j) shift $R_{i+1}$ left by one bit;

(k) adding 1 to i; and (l) repeating steps (d) to (k) until i reaches a predetermined value or $R_{i+1} = 0$; and (l) storing in said memory as said data representative of a signed magnitude quotient, a quotient resulting from step (k).

3. A system for digital information processing, said system having a memory for storing data, including data representative of a quotient $Q = a_0 a_1 a_2 \ldots a_b$ from data representative of a divisor $Y = y_1 y_2 \ldots y_n$ and data representative of a dividend $X = x_1 x_2 \ldots x_a$, said data representative of a quotient generated by a method comprising the steps of:

(a) aligning the first non-zero bit of X with the first non-zero digit of Y;

(b) defining a signed-digit partial remainder series $R_i$ where $R_0=Y$, a first sign series of the partial remainder $S_i$ where $S_0=0$, a second sign series of the partial remainder $S_{ri}$, a quotient bit series $a_i$, and a counter i beginning from zero;

(c) subtracting X from $R_i$ which yields next signed-digit partial remainder $R_{i+1}$;

(d) setting the sign of $R_{i+1}$ to $S_{ri+1}$;

(e) setting the result of exclusive-OR of $S_i$ and $S_{ri+1}$ to the true sign of the next remainder $S_{i+1}$;

(f) setting $a_i$ to 1 if $S_{i+1}=0$ or $R_{i+1}=0$;

(g) setting $a_i$ to 0 if $S_{i+1}=1$;

(h) inverting the signs of all digits of $R_{+1}$ if $S_{+1}=1$;

(i) shift $R_{i+1}$ left by one bit;

(j) adding 1 to i;

(k) repeating steps (c) to (j) until i reaches a predetermined value or $R_{i+1}=0$; and (l) storing in said memory as said data representative of a quotient, a quotient resulting from step (k).

4. A system for digital information processing, said system having a memory for storing data, including data representative of a signed magnitude quotient $Q_2=a_s a_0 \cdot a_1 a_2 \ldots a_b$ from data representative of a signed divisor $Y_s = y_s \cdot y_1 y_2 \ldots y_n$, and data representative of a signed dividend $X_s = x_s \cdot x_1 x_2 \ldots x_s$, said data representative of a signed magnitude quotient generated by a method comprising the steps of:

(a) obtaining $a_s$ from the result of exclusive-OR of $y_s$ and $x_s$;

(b) defining a divisor $Y=y_1 y_2 \ldots y_n$, a dividend $X=x_1 x_2 \ldots x_s$, a signed-digit partial remainder series $R_i$ where $R_0=Y$, a first sign series of the partial remainder $S_i$ where $S_0=0$, a second sign series of the partial remainder $S_{ri}$, a quotient bit series $a_i$, and a counter i beginning from zero;

(c) aligning the first non-zero bit of X with the first non-zero digit of Y;

(d) subtracting X from $R_i$ which yields next signed-digit partial remainder $R_{i+1}$;

(e) setting the sign of $R_{i+1}$ to $S_{ri+1}$;

(f) setting the result of exclusive-OR of $S_i$ and $S_{ri+1}$ to the true sign of the next remainder $S_{i+1}$;

(g) setting $a_i$ to 1 if $S_{i+1}=0$ or $R_{i+1}=0$;

(h) setting $a_i$ to 0 if $S_{i+1}=1$;

(i) inverting the signs of all digits of $R_{i+1}$ if $S_{i+1}=1$;

(j) shift $R_{i+1}$ left by one bit;

(k) adding 1 to i;

(l) repeating steps (d) to (k) until i reaches a predetermined value or $R_{i+1}=0$; and (m) storing in said memory as said data representative of a signed magnitude quotient, a quotient resulting from step (l).

\* \* \* \* \*